US006921595B2

(12) United States Patent  
Clawson et al.

(10) Patent No.: US 6,921,595 B2  
(45) Date of Patent: Jul. 26, 2005

(54) JOINT-CYCLE HIGH-EFFICIENCY FUEL CELL SYSTEM WITH POWER GENERATING TURBINE

(75) Inventors: Lawrence G. Clawson, Dover, MA (US); Mark R. Hagan, Somerville, MA (US)

(73) Assignee: Nuvera Fuel Cells, Inc., Cambridge, MA (US)

( * ) Notice: Subject to any disclaimer, the term of this patent is extended or adjusted under 35 U.S.C. 154(b) by 325 days.

(21) Appl. No.: 09/870,412

(22) Filed: May 30, 2001

(65) Prior Publication Data

US 2002/0004152 A1 Jan. 10, 2002

Related U.S. Application Data

(60) Provisional application No. 60/208,355, filed on May 31, 2000.

(51) Int. Cl.[7] .......................... H01M 8/04; H01M 8/18; H01M 8/00; H01M 8/12; H01M 2/00
(52) U.S. Cl. ............................. 429/17; 429/13; 429/19; 429/26; 429/34
(58) Field of Search ............................. 429/17, 19, 26, 429/34, 38, 12, 13

(56) References Cited

U.S. PATENT DOCUMENTS

| 3,554,174 A | 1/1971 | Clawson |
| 3,976,507 A | 8/1976 | Bloomfield |

(Continued)

FOREIGN PATENT DOCUMENTS

| DE | 197 55 116 C 1 | 3/1999 |
| EP | 0 920 064 A1 | 6/1999 |

(Continued)

OTHER PUBLICATIONS

*Fuel Cell Handbook*, 5th ed., pp. 9–37–9–38 by USDOE/NETL (Nat'l Energy Tech. Lab) (Oct. 2000).

*Fuel Cell Handbook*, 5th ed., pp. 9–58–9–70 by USDOE/NETL (Nat'l Energy Tech. Lab( (Oct. 2000).

*Primary Examiner*—Patrick Joseph Ryan
*Assistant Examiner*—Julian Mercado
(74) *Attorney, Agent, or Firm*—Hamilton, Brook, Smith & Reynolds, P.C.

(57) ABSTRACT

The efficiency of a combination reformer/fuel cell system is significantly improved by recapturing the energy value of heat generated in the fuel cell and producing additional power. The cooling water from the fuel cell is mixed, entirely or in part, with sufficient or excess compressed air, and at least partially evaporates in the compressed air. The air is at least sufficient to support the oxidative reactions in the fuel cell and also to serve as oxidant in a burner that provides heat to reform fuel/steam mixtures into hydrogen-containing reformate. This air/steam mixture, after leaving the fuel cell, is further heated by heat exchange with the reformate stream and reformate-producing modules, and with the exhaust stream of the burner. The steam/air mixture is injected into the burner, optionally after superheating in the burner exhaust, and is reacted with fuel in the burner. The burner exhaust may be used to provide heat to a fuel reforming reaction. The high-temperature burner exhaust may also be used to drive an expander, preferably a turbine, at a location in the system which is downstream of the burner, but in which the exhaust is at a high temperature so as to run the turbine efficiently. The turbine recovers heat energy from the fuel cell as mechanical energy, typically in excess of the energy required to run a compressor, because of the addition of steam to the compressed air. Moreover, system heat removal elements, such as radiators, as well as overall system size and cost, can be markedly reduced for a given level of output.

63 Claims, 5 Drawing Sheets

U.S. PATENT DOCUMENTS

| | | | |
|---|---|---|---|
| 3,982,962 A | 9/1976 | Bloomfield | |
| 4,004,947 A | 1/1977 | Bloomfield | |
| 4,046,119 A | 9/1977 | Perry | |
| 4,128,700 A | 12/1978 | Sederquist | |
| 4,166,435 A | 9/1979 | Kiang | |
| 4,208,989 A | 6/1980 | Hart | |
| 4,365,006 A | 12/1982 | Baker | |
| 4,473,622 A | * 9/1984 | Chludzinski et al. | 429/19 |
| 4,479,907 A | 10/1984 | Ogura | |
| 4,557,222 A | 12/1985 | Nelson | |
| 4,622,275 A | 11/1986 | Noguchi et al. | |
| 4,644,751 A | 2/1987 | Hsu | |
| 4,681,701 A | 7/1987 | Sie | |
| 4,696,871 A | 9/1987 | Pinto | |
| 4,735,186 A | 4/1988 | Parsons | |
| 4,738,903 A | 4/1988 | Garow et al. | |
| 4,913,098 A | 4/1990 | Battaglini | |
| 4,994,331 A | 2/1991 | Cohen | |
| 5,002,481 A | 3/1991 | Förster | |
| 5,034,287 A | 7/1991 | Kunz | |
| 5,335,628 A | 8/1994 | Dunbar | |
| 5,360,679 A | 11/1994 | Buswell et al. | |
| 5,449,568 A | 9/1995 | Micheli et al. | |
| 5,501,781 A | 3/1996 | Hsu et al. | |
| 5,595,059 A | 1/1997 | Huber et al. | |
| 5,624,964 A | 4/1997 | Cimini et al. | |
| 5,645,950 A | 7/1997 | Benz et al. | |
| 5,693,201 A | 12/1997 | Hsu et al. | |
| 5,758,606 A | 6/1998 | Rosen et al. | |
| 5,811,201 A | 9/1998 | Skowronski | |
| 5,873,236 A | 2/1999 | Koyama et al. | |
| 5,893,423 A | 4/1999 | Selfors et al. | |
| 5,896,738 A | 4/1999 | Yang et al. | |
| 5,948,221 A | 9/1999 | Hsu | |
| 5,976,332 A | 11/1999 | Hsu et al. | |
| 5,976,722 A | 11/1999 | Müller et al. | |
| 5,981,096 A | 11/1999 | Hornburg et al. | |
| 5,985,474 A | 11/1999 | Chen et al. | |
| 5,993,984 A | 11/1999 | Matsumura et al. | |
| 5,998,885 A | 12/1999 | Tamor et al. | |
| 6,001,499 A | * 12/1999 | Grot et al. | 429/22 |
| 6,077,620 A | 6/2000 | Pettit | |
| 6,085,512 A | 7/2000 | Agee et al. | |
| 6,106,963 A | 8/2000 | Nitta et al. | |
| 6,120,923 A | 9/2000 | Van Dine et al. | |
| 6,130,259 A | 10/2000 | Waycullis | |
| 6,190,791 B1 | 2/2001 | Hornburg | |
| 6,196,165 B1 | 3/2001 | Rósen et al. | |
| 6,213,234 B1 | 4/2001 | Rosen et al. | |
| 6,260,348 B1 | 7/2001 | Sugishita et al. | |
| 6,316,134 B1 | 11/2001 | Cownden et al. | |
| 6,365,289 B1 | 4/2002 | Lee et al. | |
| 6,365,290 B1 | 4/2002 | Ghezel-Ayagh et al. | |
| 2002/0004152 A1 | 1/2002 | Clawson et al. | |
| 2002/0163200 A1 | 11/2002 | Oglesby et al. | |

FOREIGN PATENT DOCUMENTS

| | | |
|---|---|---|
| EP | 1 104 039 A2 | 5/2001 |
| JP | 58-005975 | 1/1983 |
| JP | 58-165273 | 9/1983 |
| JP | 60-051604 | 3/1985 |
| JP | 2000-200617 | 7/2000 |
| WO | WO 01/63992 | 10/2000 |
| WO | WO 01/25140 | 4/2001 |
| WO | WO 01/95409 A2 | 12/2001 |

* cited by examiner

JOINT-CYCLE HIGH-EFFICIENCY FUEL CELL SYSTEM WITH POWER GENERATING TURBINE

RELATED APPLICATIONS

This application claims priority of Provisional Application No. 60/208,355, filed May 31, 2000.

TECHNICAL FIELD OF INVENTION

The present invention is directed to a fuel cell system having improved efficiency. Particularly, the present invention relates to methods and apparatus which use the otherwise waste heat of an operating fuel cell to do useful work. More particularly, the invention uses waste heat to create an air/steam mixture which drives an expander to produce mechanical energy, thereby improving the efficiency of the fuel cell system.

BACKGROUND OF THE INVENTION

Fuel cells have become useful energy sources over the last few decades, but wider use of fuel cells requires a continuous available source of hydrogen. One way to provide hydrogen for fuel cells in small or remote locations, or in mobile installations, is as a reformate of a hydrocarbon or oxygenated hydrocarbon fuel, such as natural gas (methane), gasoline, or alcohol. The reforming reaction, or steam reforming reaction, to produce hydrogen from a hydrocarbon fuel has been known for many years. Using methane ($CH_4$) as an example, the ideal overall reforming reaction is:

$$CH_4 + 2\ H_2O \rightarrow CO_2 + 4\ H_2 \qquad (1)$$

However, the reaction $$CH_4 + H_2O \rightarrow CO + 3\ H_2 \qquad (2)$$

is the first stage in the process, so a mixture of $CO_2$, $H_2$, $CO$, and even $H_2O$ is produced by steam reforming of methane. The carbon monoxide (CO) is an unwanted byproduct, and, in addition, is difficult to eliminate sufficiently to avoid poisoning the fuel cell. The steam reforming process is endothermic, and a substantial supply of heat is required to drive it to the right in the above reactions.

Two additional steps are often used to eliminate CO from the hydrogen-rich reformate stream. In the first, the "water gas shift" (WGS) reaction below is employed:

$$CO + H_2O \rightarrow CO_2 + H_2 \qquad (3)$$

This exothermic reaction is fast at high temperature, but is shifted to the right at low temperature. Consequently, it may be employed in two stages, the second at low temperature. The CO concentration is typically about 20 to 100 ppm following the WGS reaction, so it may be followed by gas separation on a semi-permeable membrane, or in a pressure swing absorber (PSA), to purify the hydrogen product. In a small or mobile system, this is not necessarily practical. Alternatively, the CO concentration can be reduced by a process known as selective or preferential oxidation (PrOx), represented by the following reaction:

$$2\ CO + O_2 \rightarrow 2\ CO_2 \qquad (4)$$

With suitable catalysts and moderate temperature, this reaction is strongly favored over the direct oxidation of hydrogen to form water, and the CO concentration can be reduced to suitable levels.

Other considerations in these reactions are that reactions 1 and 2 are endothermic, i.e. absorb heat when run in the direction indicated, while reactions 3 and 4 are exothermic and generate heat. However, the heat generated by the latter two reactions is typically not at a high enough temperature, and may be inadequate in quantity, to run the former two reactions at reasonable rates. Therefore, additional heat must be generated in the system by combustion of some of the fuel with oxygen. This heat must be efficiently transmitted to the steam reforming section to support the endothermic reactions.

Moreover, in many applications water generated by the overall reactions must be at least partially collected and recycled. Finally, some of the hydrogen generated by the fuel reformer is not reacted in the fuel cell. To prevent waste and pollution, this hydrogen is sometimes burned in a separate burner to provide heat, which is transferred to the endothermic reactions.

The fuel cell generates heat in operation which must be removed from the fuel cell to avoid damage. At present, this is typically done by use of a heat exchanger, whereby the excess heat is discharged to the environment as waste heat through a radiator or other means. The present invention incorporates the use of an expander, for example a turbine, to make better use of this waste heat.

A turbine is a device with a rotor turned by a moving fluid. A turbine changes potential energy of heat and pressure into mechanical energy (energy in the form of mechanical power). Gas turbine systems burn fuels, such as natural gas, oil, methane, and other hydrocarbons, to produce high-pressure, hot gases which are used directly to turn the turbine. Typically, the turbine is used to operate a compressor for the generation of pressure. Steam turbine systems use hot gases to generate high-pressure steam in a boiler. The steam moves through the turbine parallel to a shaft, first striking a row of stationary vanes that directs the steam against a first bladed disk at an optimum speed and angle. The steam then passes through any remaining stages, forcing the disks and the shaft to rotate.

Several U.S. patents teach the combination of turbines and fuel reformers, but these systems are limited to the recouping of some of the work used to pressurize reactants. For example, U.S. Pat. No. 4,681,701 to Sie (Shell Oil Co.) uses a turbo-expander driven by a portion of heated combustion gases from a reformer reactor. U.S. Pat. No. 5,873, 236 to Kayama et al. (Hitachi, Ltd.) discloses a fuel burner used to produce a high temperature combustion gas. The combustion gas drives a turbine directly coupled to a generator. Both U.S. Pat. No. 5,693,201 to Hsu et al. (Ztek Corp.) and U.S. Pat. No. 5,981,096 to Hornburg et al. (Daimler Chrysler A.G.) use at least a portion of the fuel cell exhaust to drive a turbine. However, neither reference takes advantage of latent heat of water used to humidify the fuel cell. Further, the '096 patent focuses on using a methanol/water mixture in the fuel cell as a combined fuel and coolant. U.S. Pat. No. 4,644,751 to Hsu (Massachusetts Institute of Technology) uses the waste heat from a fuel cell to assist heating of gases in a combustion chamber.

Despite improvements and refinements in such systems, the reformer/fuel cell combination is still not sufficiently efficient to be competitive with turbo-compounded internal combustion in many applications. The present invention is directed to addressing this and other problems in the art by improving the efficiency of a reformer/fuel cell system through further integration of the system and the heat exchanges within it.

SUMMARY OF THE INVENTION

Generally, the present invention is described as both a method and apparatus for increasing the efficiency of a power system incorporating a fuel cell and a fuel reformer. The increased efficiency is achieved by recovering the heat produced by a fuel cell and capturing it to do useful work in the overall system. The added, preferably mechanical energy is supplemental to the fuel cell power output—without increasing fuel input—thereby increasing overall system efficiency.

Therefore, it is one aspect of the present invention to make a pressurized air/steam mixture, optionally in admixture with water, by direct evaporation of cooling water from a fuel cell into pressurized air. By injecting the pressurized air/steam mixture with remaining oxygen as an oxidant into a fuel burner, a steam-containing exhaust having an expansion potential is produced. This expansion potential is used to drive an expander which in turn produces mechanical energy to be recovered.

Optionally, the steam-containing exhaust of the fuel burner can be used to preheat the air/steam mixture before injection and/or as a heat source for a fuel reformer before or after it is used to drive an expander.

It is still a further aspect of the present invention to provide systems for control of disclosed methods and devices for efficient operation of such systems, particularly in the presence of variable demand for electric output, and more particularly during startup of the system from a cold condition.

Other aspects of the invention will be apparent from the following detailed description and appended drawing figures, which collectively are intended to illustrate and exemplify the invention without limiting its intended scope.

DESCRIPTION OF THE DRAWING FIGURES

For further facilitating the understanding of the present invention in combination with the detailed description to follow, four drawing figures are appended hereto, wherein.

DETAILED DESCRIPTION OF THE INVENTION

Figure 1:
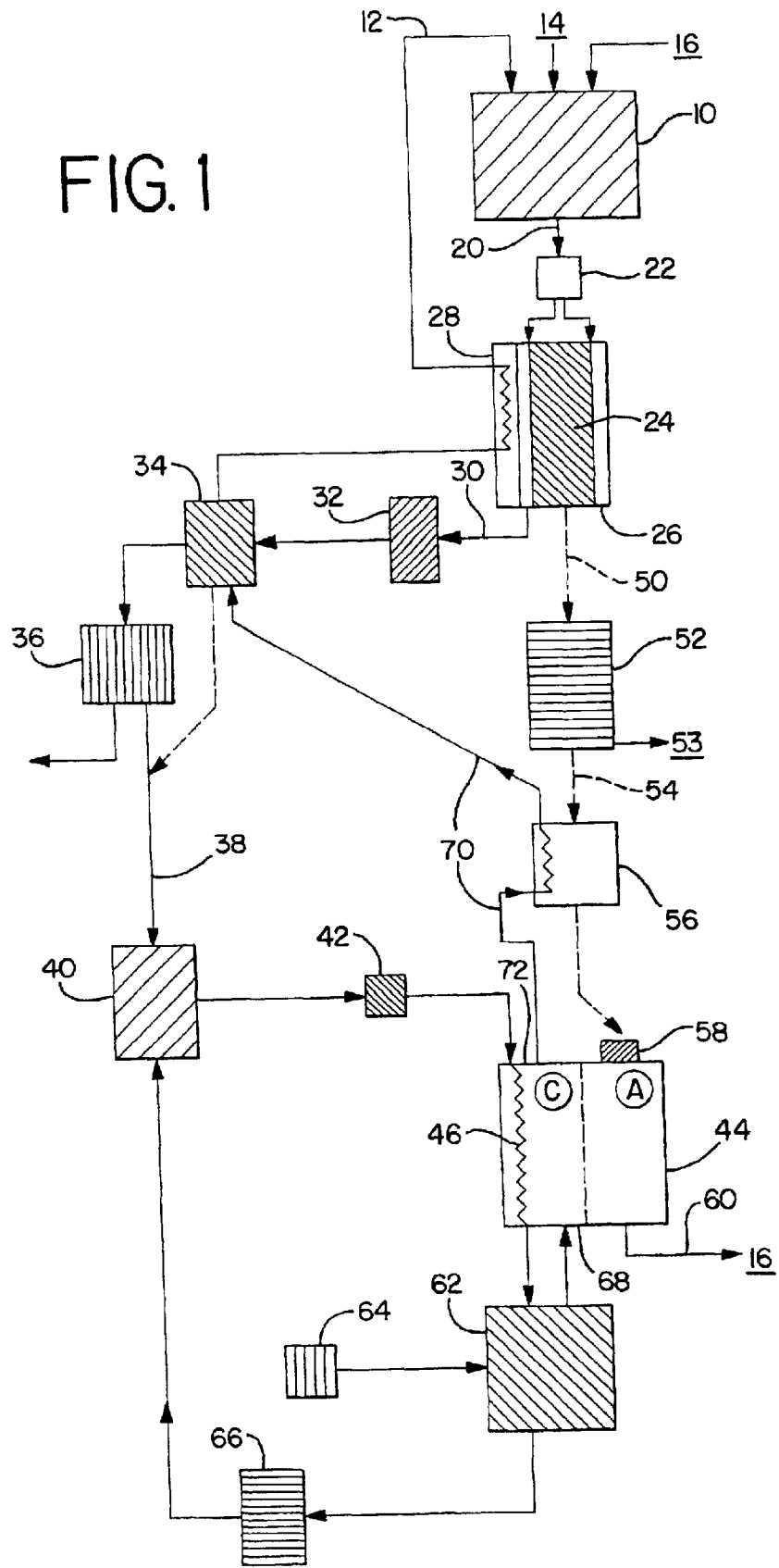
FIG. 1 is a block schematic illustrating a reformer/fuel cell system incorporating the joint-cycle of the present invention.

The features and details of the method and apparatus of the invention will now be more particularly described with reference to the accompanying drawings and pointed out in the claims. The same numeral present in different figures represents the same item. It will be understood that the particular embodiments of the invention are shown by way of illustration and not as limitations of the invention. The principal features of this invention can be employed in various embodiments without departing from the scope of the invention. All percentages and parts are by weight unless otherwise indicated.

While this invention is susceptible of embodiment in many different forms, this disclosure will describe in detail preferred embodiments of the invention. The present disclosure is to be considered as an example of the principles of the invention, and is not intended to limit the broad aspect of the invention to the embodiments illustrated.

The integrated fuel cell/fuel reformer system of the invention improves system efficiency. Efficiency is important not only in terms of operating cost, but also in the capital cost of an energy-producing system. One way of finding the efficiency of a system is by determining the sum of the power outputs of a system—in the present case, both mechanical and electric—less any power consumed internally to drive pumps, compressors and the like. Then this sum is divided by the maximum achievable rate of energy release provided by complete combustion of fuel.

Comparing two systems with different efficiencies shows the importance of even small increases in efficiency. If 1000 watts of output power is needed, then a system with 33% efficiency might burn fuel at a rate of 3000 watts, and dispose of 2000 watts of heat. Comparatively, a 50% efficient system might only burn fuel at a rate of 2000 watts and dispose of only 1000 watts of heat. Thus, for similar output the 50% efficient system might be about $\frac{2}{3}$ the size of a 33% efficient system, and use about $\frac{2}{3}$ of the fuel; but the radiator or other heat-removal means of the higher efficiency system need be only half the size of the less efficient system (1000 watts of heat vs. 2000 watts). This can be a critical difference in a mobile or portable system.

Modern fuel cells have high efficiency (up to 60% or so) in the conversion of hydrogen and oxygen to electricity. When operated as freestanding units, their waste heat is removed by circulating a coolant, such as water, through a heat exchanger, and then removing the heat from the water via a radiator or similar device. In some cases, air is used as the working coolant fluid. It is very difficult, in a free standing fuel cell, to recapture low-temperature heat in a way that creates additional power production. This is particularly true for a PEM fuel cells.

In a fuel cell that is at least partially integrated with a reformer, some of the waste heat can be recovered by using fluids from the reformer to absorb some of the heat. However, this is not practical because it requires that the fluids be cooler than the fuel cell, while almost every part of the reformer operates at higher temperatures than the fuel cell. So energy recovery is largely done by preheating air or fuel being used by the fuel cell, or by the reformer, and by recycling or burning fuel or air which is not consumed in the fuel cell during operation.

There have also been attempts to recover energy with an expander, but the expansion potential of the typical gases emitted by burners and reformers is inadequate to significantly improve efficiency.

The present invention comprises an improved method of removing heat from the cooling fluid in the fuel cell, combined with use of an expander, particularly a turbine, in the correct place in the system. The calculated efficiency improvements range from about 5% to over 18% (fractional improvement based on the starting efficiency level), more typically in a range of 8% to 14%, depending on the details of the system.

In the method of the invention, heat is removed from fuel cell cooling water by evaporation of the heated cooling water into pressurized dry air, particularly air being fed to the fuel cell as oxidant. This removes latent heat from the cooling water by evaporation to provide a moist air stream, which is a cool steam/air mixture at approximately the fuel cell temperature—for example, about 80 deg. C. in a proton exchange membrane (PEM) fuel cell. This air/steam mixture is used to supply oxygen to the fuel cell reaction, at an excess to stoichiometric, i.e., in excess to that required to oxidize the hydrogen that is consumed at power output maximum. Typically, the excess is about 100%, but in the present invention the excess air may be higher, for example 300% or higher, to provide adequate heat removal capacity. An upper limit on air flow through the fuel cell may be set by the requirement, when applicable (as in a PEM fuel cell), that the membrane be adequately hydrated.

It should be noted, the system of the present invention is also applicable to systems containing PEM fuel cells operating above 100 deg. C., for example in the range of 120 to 150 deg. C. (see U.S. Pat. No. 6,156,184). At these higher temperatures, higher fuel cell pressures are also desirable, for example, three (3) to six (6) atmospheres or higher. Application of a combined cycle reformer to such fuel cells is an excellent fit in terms of improving efficiency. To reach these pressures, the compressor used will typically be of the two-stage variety. This may be combined with a two-stage expander as well. Such two-stage compression/expanders are known to those skilled in the art, and may be present in any convenient form, such as four units on a common shaft, or as two separate units—i.e., one for low pressure and one for higher pressure.

An additional increase in efficiency is made possible by the higher PEM temperature. For example, at about 125 deg. C., at a cathode steam partial pressure of about 33 PS1G, and about four (4) atmosphere cathode air pressure, well over 0.6 mass units of steam per mass unit of air can be absorbed in the cathode output steam. All of the fuel cell cooling at full load can be applied to cathode air saturation. Under these conditions, combined cycle efficiencies can approximate 60% because of higher Brayton cycle pressures and increased "free" steam for the turbine provided by the latent heat extracted from the fuel cell cooling water.

After leaving the fuel cell, the air/steam mixture will contain additional water that was created in the fuel cell. Water may also be added to make the air/steam mixture two phase, thereby increasing its heat absorption capacity. The air/steam mixture is preferably heated in heat exchangers in low temperature parts of the system, as discussed in more detail below. Then it is preferably heated by heat exchange with the burner exhaust. After evaporation or removal of any liquid water, it may be superheated by heat exchange with the burner and/or with the reformate leaving the reformer. Next, the steam/air mixture is injected into the burner to combust with fuel. Note that there should be enough air maintained in the air/steam mixture to support the combustion. One way to achieve this is to supply the air in excess at the fuel cell entry point. Optionally, additional air/steam may be generated by evaporation of heated water with compressed air at other points in the system, and likewise heated and burned.

To produce power, the steam-containing burner exhaust is used to drive an expander, such as a turbine. This drops the exhaust gas temperature and pressure, and provides mechanical energy. The mechanical energy provided is greater when the expander is operated at a higher temperature, so the expander is preferably located close to the burner, typically either before or after the steam reformer depending on the fuel being burned and on the temperature resistance of the expander.

Provided that the joint cycle (so called because it combines elements of a Rankine cycle and a Brayton cycle) described above is followed, then an increase in system efficiency will be obtained. The net gain from the joint cycle is in essence the latent heat derived from the water evaporated into the compressed air. When the water is relatively cool (for example, below about 100 deg. C.), its heat cannot otherwise be recovered efficiently for power production.

The joint cycle can be executed in a variety of physical systems. The invention is not restricted to a particular set of heat exchange relationships. It is capable of use in a reformer system in which a burner heats the reformer by heat exchange with the burner exhaust, but is not limited to this method of heating. For example, supplementation of the heating via the burner with heat generation within the reformer, e.g., with partial oxidation or with at least some autothermal reforming, is also possible. If the fuel cell operates at a high temperature, then the coolant can be initially cooled by other processes conserving energy, such as steam generation, and then the residual energy can be recovered by the joint cycle.

System Components and Combinations

A reformer/fuel cell system of the invention should comprise at least the following functional modules. First, it will have a reformate generator module, which will conduct the fuel reforming reaction on a catalyst contained in the module. Numerous suitable catalysts are known in the art. The steam reforming reaction, for example, is preferably operated in a temperature range of about 1200–1600 deg. F. (ca. 650–900 deg. C.); at such temperatures, nickel is frequently used as the catalyst.

The reformate generator must also comprise a means for heating the steam and fuel to be reformed to the required elevated temperature. As noted above, the reaction is endothermic and is thus not self-sustaining, so heat must be supplied in proportion to the fuel to be reformed. There are several ways to do this. In one embodiment, which is illustrated here, an oxidizing reactor, also referred to herein as a burner, combusts fuel or other burnable material, such as bypassed reformate, or hydrogen from the fuel cell exhaust, to generate heat external to the reformer. The heat may be received by the fuel reformer by direct contact via shared walls, and/or by circulation of the hot exhaust of the burner through or along the fuel reformer module. In the implementation of the invention this configuration is preferred, particularly when the turbine described below is to be included.

Other embodiments of the fuel reformer heat supply include use of a partial oxidation reactor upstream of the reformer. In this arrangement a part of the fuel is oxidized, ideally with the assistance of a catalyst, and then the hot gas containing unburned fuel is mixed with steam, and the fuel is reformed. The two streams may also be combined to form an autothermal reactor (ATR), in which fuel, steam and a controlled amount of oxidant are circulated through a catalyst bed, and reacted in situ to both heat the mixture by combustion and reform the rest of the fuel with the steam. In each of these systems, the hot gaseous output of the reformer is the reformate.

On exit from the reformer, the reformate contains substantial amounts of carbon monoxide (CO). In some types of fuel cells, CO tends to poison the fuel cell catalysts, and must be at least partially removed from the reformate, or separated from the hydrogen, to create a low-CO concentration hydrogen-containing gas. This gas is fed to the fuel cell. Acceptable final CO concentrations vary, depending on any of several variables known by those skilled in the art. These include the type of fuel cell, the operating temperature, the hydrogen concentration in the feed, and the level of other reactive gases in the feed, such as oxygen. For a PEM fuel cell, the average upper limit of CO concentration is about 10 ppm, with lower levels preferred.

In one embodiment a CO removal system will typically contain at least one zone for catalyzing the water gas shift (WGS) reaction. There may be two zones, the second at lower temperature, to optimize hydrogen production and CO removal. The catalyst may be the same or different between the two zones. In such an embodiment there is typically also at least one preferential oxidation (PrOx) reactor, typically also containing a specialized catalyst, to reduce CO concentrations to a level that is appropriate for the fuel cell. CO may also be reduced by preferential methanation of CO with hydrogen on a catalyst.

Alternatively, the reformate may be purified before being passed to the fuel cell. Purification means may include a pressure swing absorber (PSA) system, a temperature swing absorber (TSA) system, and/or a hydrogen-selective permselective membrane. Such systems deliver pure hydrogen to the fuel cell, and the rest of the reformate stream— containing carbon monoxide and perhaps residual fuel—is recycled to the burner for oxidation and heat production. Systems using hydrogen purification typically do not require PrOx or methanation reactors, and may omit some or all of the water gas shift reaction as well.

Finally, there will be a fuel cell in the system which may be integrated with the other components, at least in terms of energy transfer. Optionally, the fuel cell may be contained in the same housing with other components.

The system may have an auxiliary reactor, or "tail gas burner", or similar device, to ensure complete combustion of fuel cell exhaust, bypassed reformate, or other flows, particularly intermittent flows, of combustible materials. The heat created by an auxiliary reactor may also be conveyed to appropriate regions of the apparatus to increase efficiency. The functions of the auxiliary burner are preferably carried out by the burner that is integrated with the reformer system.

The system may also have auxiliary equipment required for efficient functioning. The auxiliary equipment may include one or more of water pumps, air compressors, condensers, steam separators, radiators or other cooling devices, and water reservoirs. It may also typically comprise sensors of temperature, pressure, flow rate and other variables; controllable valves or other devices, such as injectors, to meter or regulate flows of fuel, air, water, reformate and steam; and electronic controllers to regulate the system.

Heat Exchange Devices and Methods

Any method of heat exchange or heat transfer known or used by those skilled in the art may be suitable for the present invention. Where feasible, integration of the modules into one or more common housings is an effective way to provide efficient heat transfer. Thus, a reforming zone may be annularly disposed around or within a burner zone. In addition, heat may be transferred between zones by conventional heat exchangers, such as tubing and other hollow constructions, and by passive devices such as fins.

Expanders

While any type of expander is, in principle, usable in increasing system efficiency, the use of a turbine as an expander is a presently preferred embodiment. The advantage of a turbine is that turbines are available which can operate reliably at high temperatures, such as 1200–1600 deg. F. (ca. 650–900 deg. C.), which is similar to or below the preferred temperatures for catalyzing the reforming reaction, when using fuels such as gasoline, propane or methane. For other fuels, such as methanol, reforming reaction temperatures may be lower. Operation of the expander at as high a temperature as feasible is strongly preferred to obtain maximum net mechanical work, i.e., work in excess of the work expended to compress the air at the beginning of the waste heat recapture process. A turbine has a potential disadvantage in that its efficiency is sharply peaked at a particular gas flow rate. In the system of the invention, this can be compensated for by sizing the compressed air/water heat exchange to remove approximately 40% to 50% of the excess fuel cell heat generated at maximum load. Then the compressed air flow into the system can be kept at a constant level, from about 40% of full power up to 100% power, preserving the efficiency of recovery of the waste heat. The rest of the waste heat can be removed by conventional heat exchange methods.

Alternatively, additional injection of water into the air/steam line after the fuel cell and before injection into the burner, including especially water used for fuel cell cooling or otherwise heated while performing heat exchange, allows additional capture of low-temperature energy, while maintaining volumetric flow in an appropriate range for the expander. Moreover, if the full preferred air flow would produce drying in a fuel cell, such as a PEM fuel cell, then a portion of the compressed air or air/steam can bypass the fuel cell and join the cathode exhaust beyond the fuel cell for heating.

The requirement for high temperature controls the location of the expander in the system. The temperature at the expander should be as high as feasible for maximum efficiency. With conventional metal turbines, this is in the range of about 1000 to 1600 deg. F. (ca. 450–900 deg. C.), with 1300 to 1500 deg. F. (ca. 720–850 deg. C.) being preferred. This implies that the turbine cannot be exposed directly to the exhaust, which is typically about 1800 to 2000 deg. F. (ca. 1000–1150 deg. C.). Therefore, the exhaust is preferably first used to heat the reformer, and then expanded in the turbine. This is also preferable for maximizing the temperature of the reforming reaction. However, with a fuel which is unstable and easy to reform at lower temperatures, such as methanol, then it might be preferable to use an expander capable of operating at higher temperatures in the range of about 1600 deg. F. up to 2000 deg. F. (ca. 850–1150 deg. C.), such as a ceramic turbine, and to locate it as the first component downstream of the burner. Then the cooler gas could be used to heat the reformer. Although less available, other high temperature-tolerant expanders, particularly positive pressure expanders, may be used in the invention for recovering the energy of the heated air/steam mixture in the burner exhaust.

Schematic of Joint Cycle

The invention is schematically illustrated in FIG. 1. A burner (10) receives feeds of air/steam (12), fuel (14) and preferably recycled fuel cell exhaust (16), and combusts them to create a hot exhaust (20). Any or all of the burner inputs (air, fuel, and recycled fuel cell exhaust) may be preheated by heat exchange in any suitable zone containing heat to be removed. In particular, the air/steam is preheated, as described below.

The exhaust transfers its heat to a reformer (24) by direct contact and/or by heat exchangers (26), such as the shell-type exchanger that is schematically illustrated. The reformer has inputs of fuel, steam, and optionally oxygen or air, depending on the exact design of the system (these inputs are not labeled for clarity). The heat-exchanger (26) optionally may have additional heat exchange provisions (28) for superheating of the air/steam before its injection into the burner at (12). The partially-cooled burner exhaust (30) then passes through an expander (32), from which mechanical energy is recovered (an alternative location for the expander is shown at (22), for use with easily reformed fuels).

The exhaust then passes through a heat exchanger (34), and then into a condenser (36) to capture water for recycling, and the residual gas is discharged. The recycled water (38) is recovered in a reservoir (40) that is connected to a pump (42), which supplies water to the fuel cell (44). Water is also supplied to the reservoir from other locations in the system at which it is recovered.

The reformate (50) is passed through a carbon monoxide removal system (52), unless the fuel cell does not require CO removal. The CO removal system may have inputs of steam, water or air (not marked), and has an output of low-CO-reformate or hydrogen (54). In the latter case there will also be an output of hydrogen-depleted reformate (53), which, when present, is recycled to the burner (10). Hydrogen-containing gas (54) is then passed through an optional heat exchanger (56). The heat exchanger (56) may incorporate or be supplemented by a condenser to remove water from the gas. The heat exchanger (56) is optional, particularly if the CO removal device is a PSA or membrane separator. The reformate or hydrogen then enters the fuel cell (44), optionally through a pressure reducer (58). The exhaust (60) of the anode side of the fuel cell is recycled to the burner inlet (16).

The fuel cell (44) receives pressurized water from the pump (42). The water passes through heat exchanger (46) in the fuel cell, thereby providing cooling to remove the heat generated by the fuel cell. The cooling water passes into a mixer (62). In the mixer, the warm cooling water is mixed with compressed air supplied by a compressor (64), and water evaporates, transferring its latent heat of evaporation to the resulting air/steam mixture. The amount of compressed air supplied is typically at least 100% above the stoichiometric amount required by hydrogen consumption at full power. Water that does not evaporate, if any, is recycled through an optional radiator (66) to the water reservoir (40). Alternatively, some or all such water is injected into the air/steam mixture after it has passed through the fuel cell.

The compressed saturated air from the mixer (62) enters the fuel cell (44) at an inlet (68) to provide oxidant to the fuel cell cathode compartment. The air/steam mixture (70) leaves the fuel cell at outlet (72) and is heated by exchange with system components. For example, it can be heated by exchange with the reformate (50), through heat exchanger (56), or through a heat exchanger (not illustrated) at a location between the CO removal system (52) and the reformer (24). Low-temperature heat may also be recovered at any of the various condensers, such as condenser (36), before entering the high temperature stage of heating. The air/steam mixture (70) may optionally also be preheated by heat exchangers in the CO removal section (52). Additional water may be added to the air/steam mixture in the low-temperature part of the system, i.e., from the outlet of the fuel cell up to about the inlet portion of heat exchanger (34), to facilitate heat absorption. Addition of water to hotter portions of the air/steam path is possible but less advantageous.

The air/steam mixture (70) is then raised to a higher temperature by heat exchange with the burner exhaust in heat exchanger (34). This heat exchange step recovers most of the heat from the burner exhaust after it exits the reformer and the expander, and prepares the exhaust for condensation to recover water. As the air/steam mixture leaves the exhaust heat exchanges, any residual liquid water in the air/steam mixture is preferably removed and recycled, for example to the reservoir (40). As an optional further heating step, the air/steam mixture is superheated, for example by exchange with the exhaust above the expander (28) or with the reformate at (50).

Finally the air/steam mixture is injected into the burner at the air/steam inlet (12), mixed with one or more streams of fuel, recycled reformate and anode exhaust, and combusted to obtain burner exhaust gas at a high temperature, typically about 2000 deg. F. (1150 deg. C.). In the joint cycle of the invention, the burner exhaust gas is loaded with steam, and is still pressurized above atmospheric pressure. This creates additional expansion potential compared to a burner exhaust stream not containing steam, and this extra expansion potential can be captured by an expander (32), such as a turbine.

The expander (32) can be located at any point in the path of the burner exhaust, but certain locations are favored by the temperature profile of the particular system. In the system shown, a preferred location for the expander (32) is after the exhaust has heated the reformer (24). This allows the exhaust, with an initial temperature of 2000 deg. F. (1150 deg. C.) or more, to heat the reformer to a temperature of about 1400–1800 deg. F. (770–1000 deg. C.). The exhaust, now at about 1400–1600 deg. F. (ca. 770–890 deg. C.), is now cool enough to operate a conventional expander, such as an automotive grade expander turbine. It is thermodynamically advantageous to operate the expander at as high a temperature as feasible. After expansion in the turbine or other expander, the exhaust is cooled by expansion by about 200 to 400 deg. F. (110–220 deg. C.), and is at about atmospheric pressure. The exhaust then heats the incoming steam/air mixture in heat exchanger (34), which also separates any excess water from the air/water/steam mixture, after which the exhaust is passed through a condenser (30) to recover water. The water is returned to the reservoir, completing the cycle.

The expander is used to supply mechanical power to the system. The mechanical power may be used to drive mechanical components of the system, such as a pump or a compressor. It may also or instead be used to drive a generator, and thereby supply electric power to the system, supplementing the fuel cell's electrical output. This is particularly important at system startup and during system transients to increase power, where the very rapid increase in electric driving potential provided by the expander can compensate for the relatively slow warm-up and response of the reforming system as a whole. Rapid response is particularly important in transportation applications.

Calculations of the amount of additional system efficiency indicate that a significant increase is possible with the complete system of recuperation of the fuel cell heat that is shown here. The exact values depend on the mode of operation of the system and numerous additional variables. Typical numbers for system efficiency for mobile systems are in the range of about 30–35%. Recovery of half the energy value of the fuel cell waste heat can raise the system efficiency by at least 5%, more typically 15% or more, for example from a system efficiency of 35% to 41% (a 15% gain in efficiency.) Recovery of higher proportions of the fuel cell waste heat is possible, and may further raise efficiency. Higher efficiencies may require additional air supply, which, as noted above, may not necessarily pass through the fuel cell.

In addition to the efficiency gains made by recovering heat from the fuel cell by evaporation of water and using that steam to drive an expander, it should be noted that the use of the expanded exhaust to preheat the feeds for the burner also promotes efficiency. This is accomplished by providing for 100% recuperation of the extra fuel energy required to drive the expander. Normally, with a separate recuperator, the energy input used to drive an expander cannot be completely recovered.

To understand how this is possible, consider the heat exchanger (34) in FIG. 1, which acts as the recuperator of the expander in the disclosed arrangement. The input air/steam (70) is at a particular temperature, for example 200 deg. F. (ca. 95 deg. C.), and the design temperature of the output to the condenser (36) is at, for example, 400 deg. F. (ca. 205 deg. C.). If there is no expander in the system, the burner exhaust will enter heat exchanger (34) at about 1600 deg. F. (ca. 890 deg. C.) and the air/steam mixture will leave the recuperator at about 1400 deg. F. (ca. 780 deg. C.). The inefficiency of this step is built into the design. However, if there is an expander (32) in the system, then the burner exhaust will enter the recuperator at a lower temperature, about 1300 deg. F. (ca. 720 deg. C.). The air/steam then will leave the recuperator at only about 1100 deg. F. (ca. 610 deg. C.). The 300 deg. F. (ca. 165 deg. C.) difference is made up by burning additional fuel in the burner so that the burner exhaust will leave the burner (10) and heat the reformer (24) at about 1800–2000 deg. F. (ca. 1000–1100 deg. C.). However, this energy is exactly the energy that is recovered in the expander, as the exhaust drops from 1600 to 1300 deg. F. (from ca. 890 to ca. 720 deg. C.) on passing through the expander. Therefore, because all of the heat added to drive the expander is recovered, the expander is effectively 100% efficient, compared to a system without the expander.

It is thus particularly advantageous in a system using the joint cycle to use a heat exchanger operating between the air/steam feed, and the burner exhaust, as the primary recuperator for the expander.

Efficiency gains in this range are significant in three ways. First, the efficiency of a system incorporating the joint cycle may approach that of a bottoming cycle internal combustion engine, while retaining the advantages of a fuel cell in terms of low emissions. Second, the joint cycle, which rejects less heat to the environment, allows use of a smaller fuel cell and fuel generator for a given power output, saving weight and cost. Third, a higher efficiency directly translates into a smaller heat disposal means, such as a radiator or condenser, for a given output level. Since the second and third effects multiply, reduction in the area of the radiator is potentially very significant.

The efficiency gains made possible by the use of the joint cycle have been illustrated in terms of a particular system, to make the effects of the joint cycle more easily understood. However, the use of the joint cycle is not limited to the system illustrated. The key principle of the joint cycle is the extraction of energy from low-temperature "waste" heat, particularly the waste heat of fuel cell operation, by using it to evaporate water into compressed air. The resulting air/steam or air/steam/water mixture is then heated, in any convenient way, and is finally injected under pressure at high temperature into an expander. The expander is harnessed to create mechanical work. The net mechanical work generated corresponds to the latent heat imparted to the air/steam/water mixture—and subtracted from cooling water and the like—by the evaporation of water. The latent heat absorbed is the basis of the net energy gain achieved by the use of the joint cycle.

The joint cycle, being the combination of evaporation, heating and expansion as described above, is, in principle, suitable for enhancing the efficiency of any combined fuel generator/fuel cell system. Its extra complexity is best justified when the waste heat to be recovered is at a low temperature, so that it cannot be used directly to make steam. It is particularly advantageous for a PEM fuel cell, in which the upper operating temperature is typically below about 100 deg. C. Note, however, that a joint cycle application to higher temperature PEM membranes extracts greater gains through higher pressure operation with more steam.

Adaptations may be required, and options are contemplated, particularly in the details of heat transfer and exchange, depending on the exact types of modules composing the system. The reformer has been illustrated as a steam reformer, but at least some partial oxidation, whether in a separate module or in the autothermal reactor mode, can be used. The carbon monoxide removal system may be a combination of a water gas shift and a preferential oxidation, or may be via a PSA, a TSA, a preferential methanation, or a hydrogen selective membrane, with or without a water gas shift. Any expander is in principle useful, but a turbine is the preferred choice in terms of small, light, commercially available expanders operating in the 1000–2000 deg. F. (550–1150 deg. C.) range.

It has long been a goal in the development of fuel cell technology to increase system efficiency. Thus, the modifications to a fuel reformer/fuel cell system provided by the incorporation of the joint cycle of the invention are significant, and are expected to enhance the commercial success of integrated reformer/fuel cell systems.

Exemplary Embodiment of the Joint Cycle

While FIG. 1 illustrates a general implementation of the basic concepts of the present invention, the remaining figures (FIGS. 2–7) are directed to a specific exemplary embodiment of the invention. The specific component configurations disclosed are not intended to be limiting to the scope of possible alternatives available to those skilled in the art. No correlation is intended between the following 100-series reference numbers used to describe the specific components of the exemplary embodiment and the above sub-100 reference numbers used to describe general system components, and the like.

Figure 2:
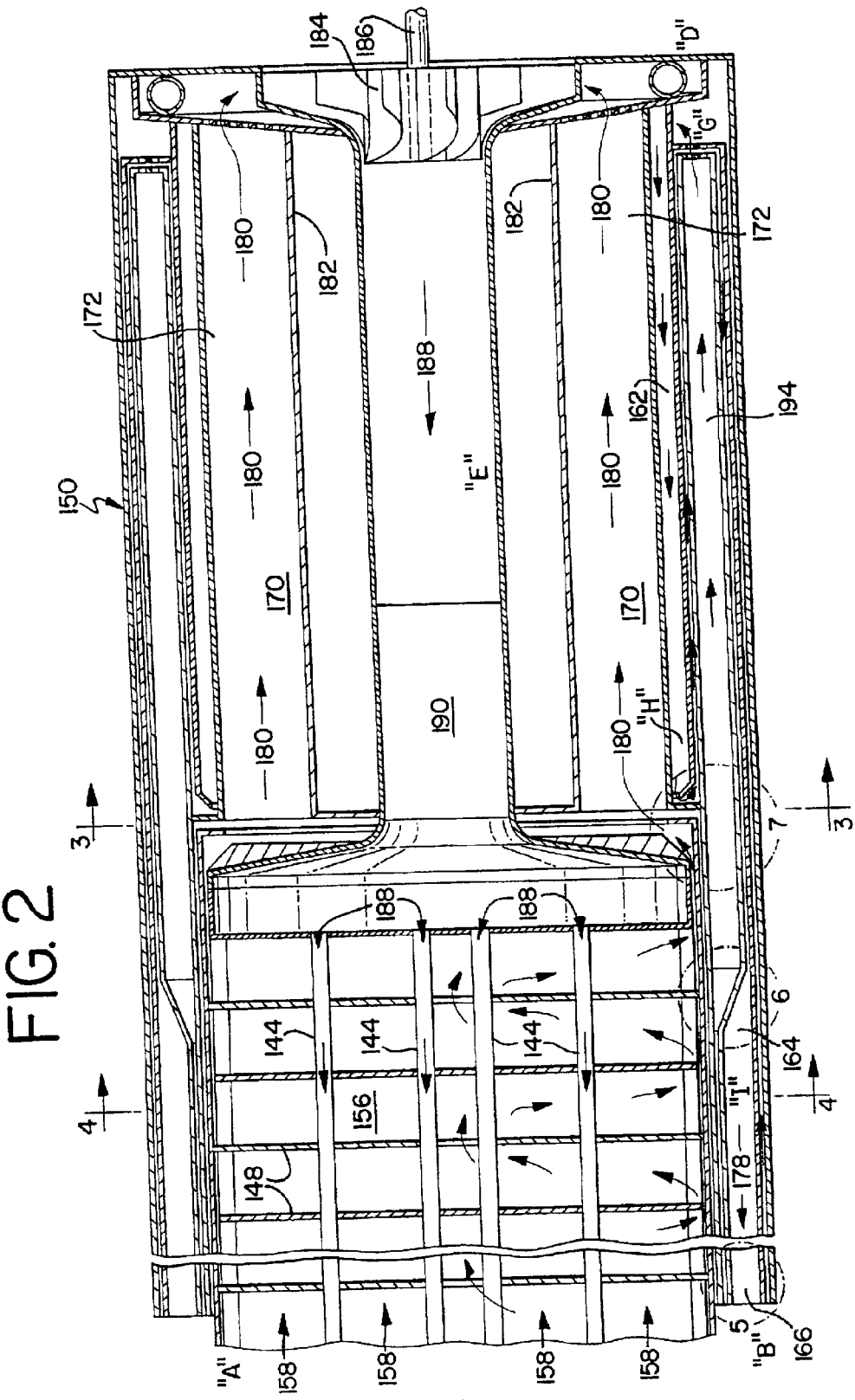
FIG. 2 is a cross section of one embodiment of the present invention illustrating the reformer region of the system.

FIG. 2 shows a design for the physical implementation of the reactor schematically illustrated in FIG. 1. Only the reformer region of the fuel processor is shown. This figure does not accurately represent the relative dimensions of the parts, particularly the heat exchangers. It is intended to illustrate how such a reactor might be constructed, and is not meant to place limitations on the methods of construction.

Preheating the Air/Steam Mixture (Point "A")

Vitiated air from the fuel cell cathode along with water vapor derived from fuel cell cooling is heated in the large centrally located heat exchanger or regenerator by counter-flow with the turbine exhaust (188). This cathode air flow contains the left-over oxygen from the fuel cell process, about 10%–11% by volume at the normal full load fuel cell operation (i.e., at 200% of stoichiometric requirements of cathode air). It also contains steam or water vapor obtained by complete saturation of the cathode air with cooling water. The cathode air/water mixture absorbs heat from various components en route to the reformer/expander region of the system, including by cooling of the reformate, the anode gas, and/or the cooler regions of the burner exhaust stream. For a 70 kW total system output (electric) incorporating a PEM fuel cell operating at 100% or less, cathode air flow ranges from 400 to 500 lbs/hr (ca. 180 to 230 kg/hr), and the air contains about 200 to 270 lbs (ca 90 to 125 kg) of water at about two atmospheres of pressure.

Referring to FIG. 2, the cathode exhaust flow, an air/steam mixture (158), enters the heat exchanger (156) at point "A".

Figure 4:
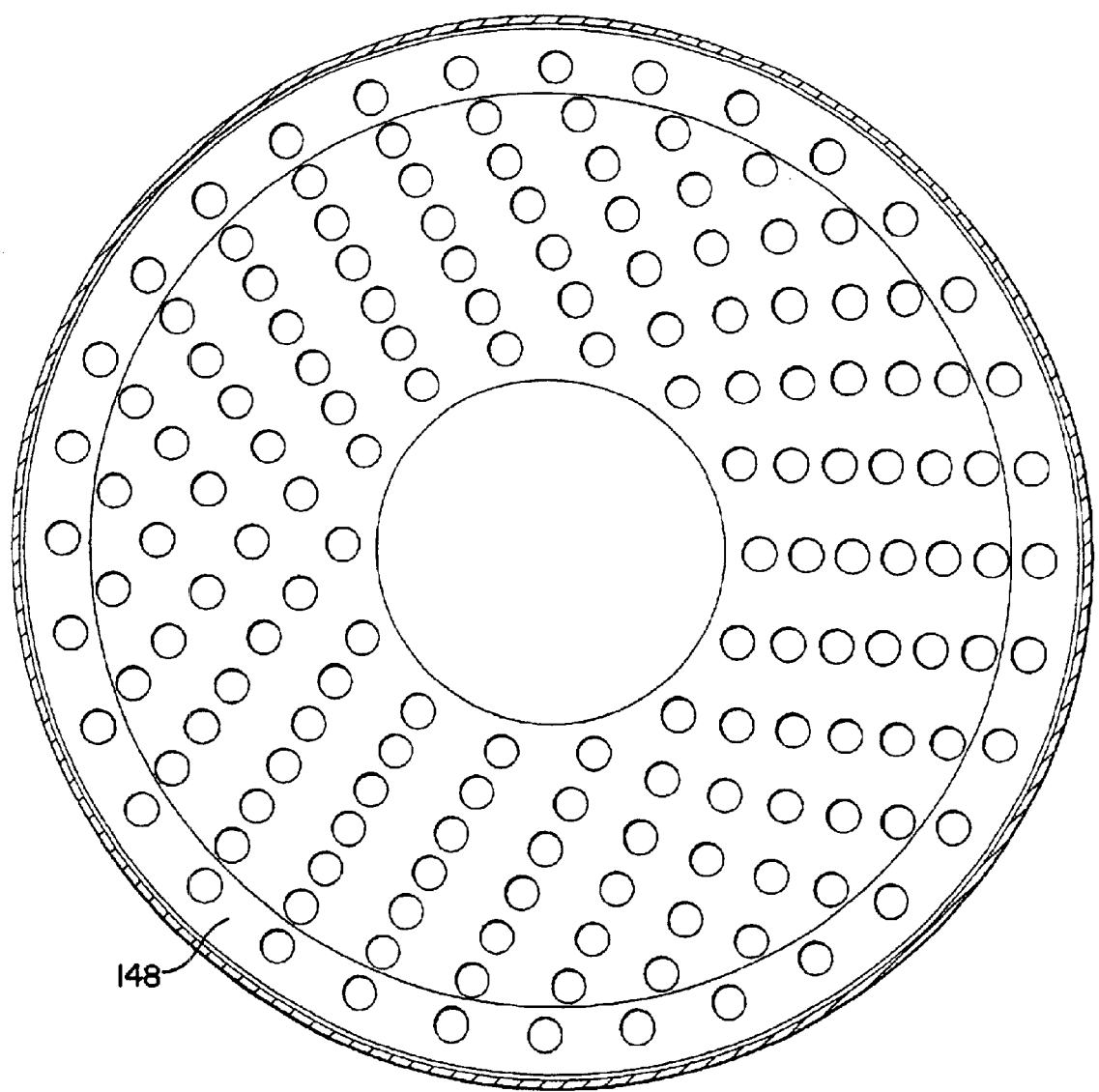
FIG. 4 is a cross section of the regenerator portion of the reformer at line 4—4 of FIG. 2, illustrating in one embodiment the arrangement of tubing passages and cathode air baffles.

The entering air/steam mixture (158) is preferably pretreated, as described above. Transit through the heat exchanger (156) increases the temperature of the air/steam mixture (158) from about 220 deg. F. (100 deg. C.) at the inlet to within 300 deg. F. (ca. 170 deg. C.) of the turbine outlet temperature, or to about 1000 deg. F. (ca. 550 deg. C.). The air may optionally contain dilute fuel (e.g., methane) for producing additional heating in the burner (170). FIG. 4 illustrates one possible configuration of baffles (142). The baffles (148) support heat exchange tubes (144) carrying hot turbine exhaust (188), while providing a tortuous route for cathode exhaust (158) as it passes through heat exchanger (156).

Turbine Fuel (Point "B")

Figure 5:
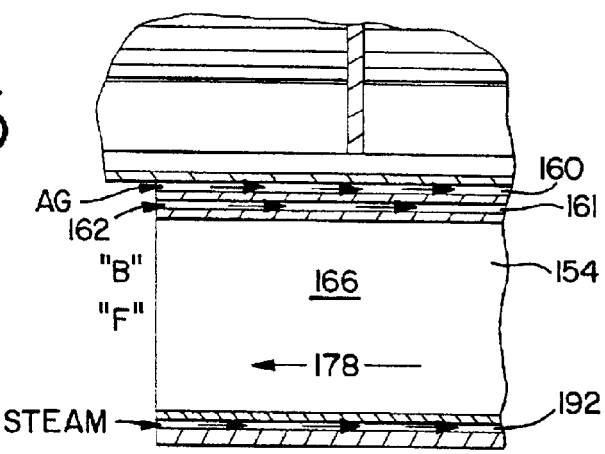
FIG. 5 is an enlarged view of section 5 of FIG. 2.

Referring to FIG. 5, anode gas (AG) returned from the fuel cell, typically also containing water vapor, enters at point "B" and is separately heated in a small gap annulus (160) around the cathode air/burner exhaust heat exchanger (156) described above. It is primarily heated by countercurrent exchange with the reformate, which flows in a surrounding annulus (154), but also is heated by the parallel flow of the cathode exhaust (158). This cooling is important to condition the reformate stream to be cool enough to enter the high-temperature water-gas-shift (WGS) bed (164) (FIG. 6) and later the low temperature WGS bed (166). Separation during preheating of the hydrogen in the anode gas from the air in the cathode exhaust prevents premature ignition.

Typically, additional fuel will be needed to supplement the anode gas (AG) in order to complete the reforming reaction. The fuel may be conveniently added to the anode gas (AG) before it enters the region of the fuel processor (150) illustrated in FIG. 5, to effect an anode gas/fuel mixture (168). Alternatively, a stable fuel, such as methane, may be injected into the cathode air stream (158). The extra fuel may also be injected at point "D" below.

Integrated Burner (Point "C")

Figure 3:
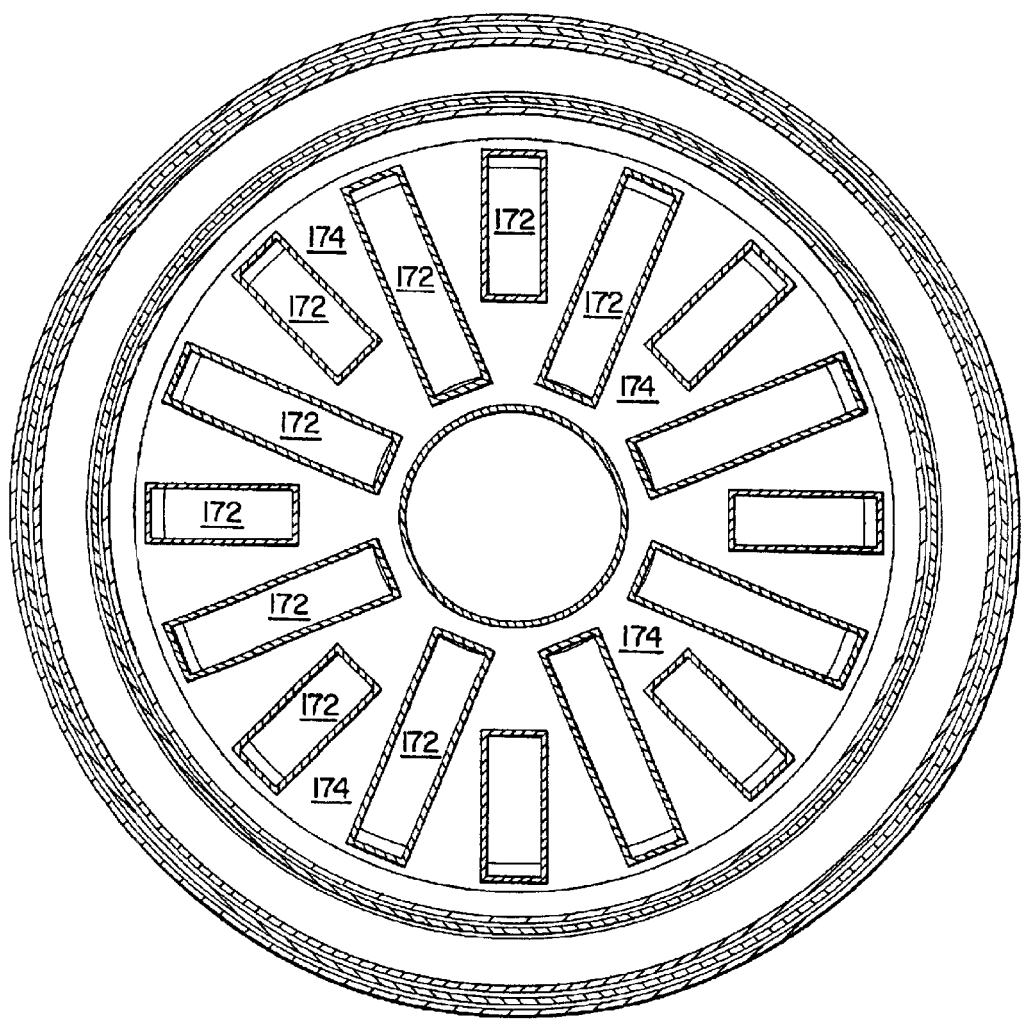
FIG. 3 is a cross section of the reformer section at line 3—3 of FIG. 2, illustrating in one embodiment the placement of burner mesh and reformer catalyst.

The cathode air/steam (158) and the anode gas/fuel (160) are mixed at point "C" to form an air-anode gas, fuel/steam mixture (180) and burned, optionally catalytically, in burner chambers (172) or passages embedded in the reforming catalyst (174). In FIG. 3, the burning chambers (172) are shown in cross-section as rectangular chambers embedded in the reformer catalyst (174). The resulting reformate fuel/steam mixture or reformate mixture (170) flows counter-current to the burner chamber and absorbs energy from the high-temperature burner gas. The reformate mixture (170) exits at temperatures in the range of 1000 to 1400 deg. F. (ca. 550 to 775 deg. C.).

Turbine Operation (Point "D")

The burner exhaust gases (180) exit from the reformer bed heat exchangers (182) at point "D" and enter nozzles in the turbine (184). The gases are at about 1500–1600 deg. F. (ca. 800–900 deg. C.) and at about 2 atmospheres absolute pressure (ca. 0.2 Mpa). These temperatures determine the materials required for the manufacture of the turbine. If the turbine (184) is about 85% efficient, the gas temperature drops by about 300 deg. F. (ca. 170 deg. C.), and about 17 to 21 kW of power is produced at full burner flow. A compressor (not shown), which may be mounted on the turbine shaft (186), will absorb 5 kW or less of power in compressing the cathode air to 2 atmospheres. The rest of the power is available to generate electricity, for a net power gain of 12 to 16 kW. This is a significant fraction of the 70 kW total power output of the fuel processor/fuel cell system.

During system startup, fuel and air may be ignited by a separate igniter and may be introduced into the turbine (184) to provide system power while the reformer catalyst (174) are being heated up to operating temperature. In this stage, reformer output will typically be bypassed around the fuel cell, and will enter a combustion zone via the anode exhaust channel described at point "B".

Regeneration (Point "E")

At point "E" the turbine exhaust (188) passes through an optional catalytic cleanup bed (190)—for example, with an automotive-type catalyst—to remove any residual hydrogen or carbon monoxide. The turbine exhaust (188), now at about 1200–1300 deg. F. (ca. 650–750 deg. C.), passes into the large heat exchanger (156) through which the cathode exhaust (158) entered. The turbine exhaust (188) will typically be at about 500 deg. F. (ca. 260 deg. C.) on leaving the heat exchanger (156), and is typically next used to make steam in a steam generator.

Reformate Fuel/Steam Preheat (Point "F")

Returning to FIG. 5 and with reference to point "F", the reformate loop starts with annuli (161) carrying a steam/fuel mixture (162) and optionally steam. The inner annulus (161) is preheated primarily by the water-gas-shift beds (HTS (164) and LTS (166)). In turn, the steam/fuel mixture (162) transfers heat to the anode gas flowing co-currently in the annulus (161). Some of the steam for reforming and water-gas-shift may be circulated through an outer annulus (192) to help control the temperature of the HTS and LTS beds, (164) and (166), respectively, by varying the functionally effective heat transfer area. Alternatively, some of this steam could bypass the reformer (150) and be injected into the reformate stream above or in the shift beds as a further means of temperature control.

Figure 6:
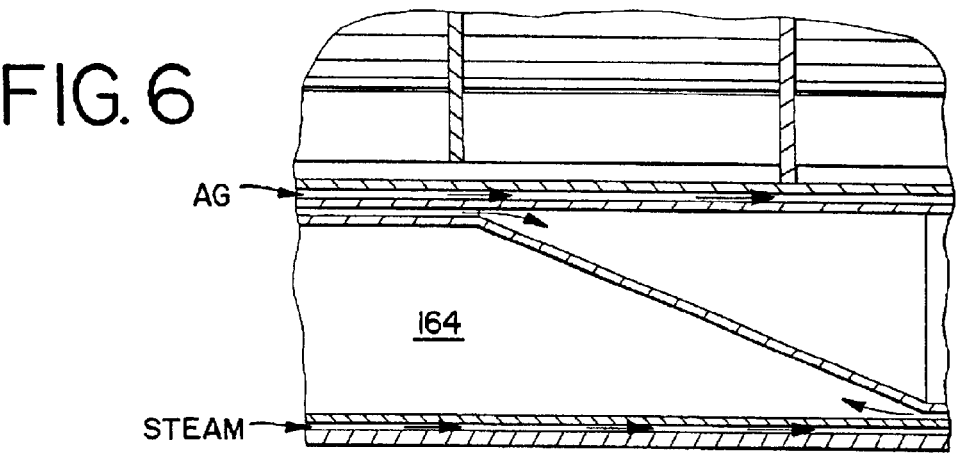
FIG. 6 is an enlarged view of section 6 of FIG. 2.
Figure 7:
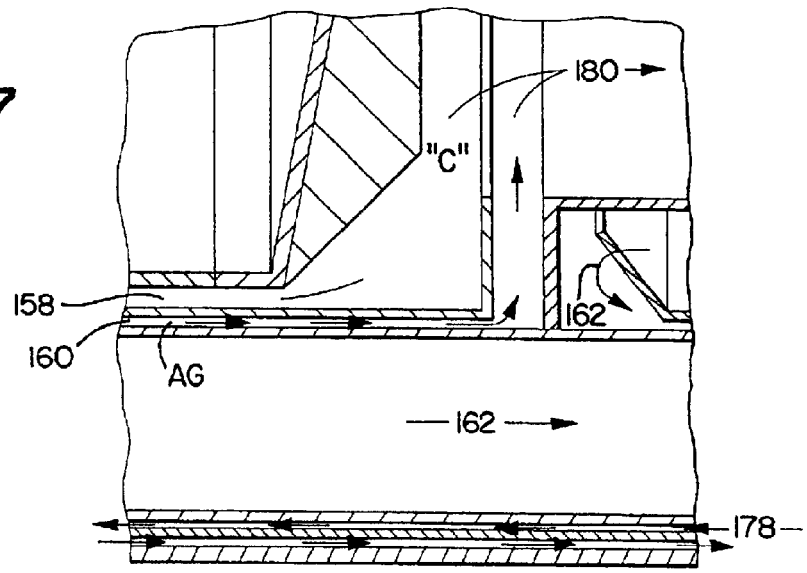
FIG. 7 is an enlarged view of section 7 of FIG. 2.

As illustrated in FIG. 6, above the HTS bed (164), the steam/fuel mixture (162) is heated by counter-current exchange with the reformate mixture (170). In the present embodiment illustrated in FIG. 2, the inlet widens and the steam/fuel flows over a catalyst, thereby preventing cracking as the temperature of the fuel rises.

Reforming (Point "G")

After being heated against the reformate, the steam/fuel mixture (162), and extra steam, if any, are mixed at point "G" and enter the reforming catalyst bed (174). The gases flow through the reformer (150) countercurrent to the burner mixture (180), and co-current to the turbine exhaust (188), where they collect at Point "H".

Reformate Temperature Management (Point "H")

The now reformed steam/fuel mixture (162) leaves the reformer (150) and passes "upward" towards the burner (170), outward across a preheat catalyst bed (194) through bridging sections, and "downward" past the steam/fuel pre-heating zone (194) to the shift beds (164) (166). The initially hot reformate is cooled by heat exchange with the incoming steam/fuel mixture (162), and its temperature drops from an initial temperature of about 1500 deg. F. (ca. 830 deg. C.) to a temperature appropriate for the high temperature shift reaction, about 600–800 def. F (ca. 320–440 deg. C.).

Water Gas Shift Temperature Management (Point "I")

At point "I" the heat from the exothermic shift reactions, and additional heat from the reformate (178), is absorbed by the incoming steam and steam/fuel flows, and also by the anode exhaust gas (AG). The reformate (178) exits from the shift section at about 500–600 deg. F. (ca. 260–320 deg. C.), and passes through further heat exchange (not shown) and optional carbon monoxide removal units (FIG. 1) before entering the fuel cell and/or a hydrogen storage module.

Alternatives

The described process is a particular preferred design, using the thermal management procedures of the invention, adapted to using a steam reformer for reforming the fuel. The pressure in the reformer is not tightly limited in this design. It is preferably at least as high as the pressure in the fuel cell cathode—about two atmospheres absolute, and can be as high as is practical and convenient, for example 3 to 4 atmospheres or even 10 atmospheres (ca. 1 MPa). Higher pressures make it convenient to accumulate hydrogen from the reformate into a hydrogen accumulator, such as a pressure vessel optionally containing metal hydride; such stored hydrogen is useful at startup and during transients.

The process is not limited to use of a steam reforming reaction. Using the joint cycle with an autothermal reformer or a partial-oxidation reformer is also possible. In such a reactor, most of the heat required for the endothermic reforming reaction may be supplied by including air along with the fuel and steam, and creating the heat in or before the reforming catalyst bed. The burner could serve primarily as a heat shield and as a means of disposal of anode gas, which would be mixed with humidified cathode exhaust air, as described above, burned, and passed through a turbine as well. A mixed system in which some of the required heat is supplied by the burner and some by an autothermal reaction is also possible.

We claim:

1. A method for increasing the efficiency of a system comprising a fuel reformer coupled to a fuel cell, the method comprising the steps of:
   providing pressurized air;
   using heat generated by the fuel cell to make a pressurized air/steam mixture, optionally in admixture with water, by direct evaporation of cooling water from the fuel cell into the pressurized air;
   introducing the air/steam mixture as an oxidant into a fuel burner;
   producing a steam-containing exhaust having an expansion potential from the fuel burner;
   driving an expander using the expansion potential of the steam-containing exhaust; and
   recovering mechanical energy from the expander in excess of the energy used in compressing the pressurized air.

2. The method of claim 1, further comprising the step of preheating the air/steam mixture in the steam-containing exhaust of the fuel burner before introduction into the burner.

3. The method of claim 1, further comprising the step of using the air/steam mixture as a humidified oxidant of a fuel cell.

4. The method of claim 1, further comprising the step of introducing additional water into the air/steam mixture.

5. The method of claim 4, wherein the step of introducing additional water occurs after the mixture has emerged from the fuel cell.

6. The method of claim 4, wherein the air/steam mixture travels a path from the fuel cell to the burner and wherein water is present in the air/steam mixture in at least part of the path.

7. The method of claim 6, further comprising the step of removing water from the air/steam mixture at a selected point in the path before introduction of the mixture into the burner.

8. The method of claim 1, wherein the steam-containing exhaust is a heat source for a fuel reformer.

9. The method of claim 8, wherein the fuel reformer conducts at least one reaction selected from the group consisting of steam reforming, partial oxidation and autothermal reforming.

10. The method of claim 9, wherein the fuel reformer reaction comprises steam reforming.

11. The method of claim 1, further comprising the step of treating a reformate to reduce carbon monoxide concentration.

12. The method of claim 11, wherein the step of treating a reformate is at least one of the following processes selected from the group consisting of a water gas shift, preferential oxidation of carbon monoxide, preferential methanation of carbon monoxide with hydrogen on a catalyst, separation of hydrogen in a pressure swing absorption bed, separation of hydrogen in a temperature swing absorption bed, and separation of hydrogen by a hydrogen-selective membrane.

13. The method of claim 11 wherein the step of treating a reformate comprises a water gas shift.

14. The method of claim 11, wherein the step of treating a reformate consists essentially of at least one water gas shift and at least one preferential oxidation of carbon monoxide.

15. The method of claim 1, further comprising the step of heating a reformer with the burner exhaust before driving the expander.

16. The method of claim 1, further comprising the step of heating a reformer with the burner exhaust after driving the expander.

17. The method of claim 1, wherein the expander is a turbine.

18. The method of claim 1, further comprising the use of the heat exchanger that cools the exhaust after it leaves the expander as a preheater for at least one of the feeds for the burner, thereby recuperating the turbine exhaust.

19. The method of claim 1, further comprising preheating at least one of a steam fuel mixture, anode gas, and steam.

20. The method of claim 19, wherein the preheating is performed through concentrically arranged annuli.

21. An integrated fuel generator/fuel cell system, the system comprising:
   a fuel reformer;
   a fuel cell coupled to the fuel reformer;
   a cooling system for the fuel cell configured to produce heated water;
   a source of pressurized air, pressurized air from the source being used to evaporate the heated water thereby creating a pressurized air/steam mixture;
   a burner in which the air/steam mixture is combusted with a fuel to create a steam-containing burner exhaust; and
   an expander in which the burner exhaust expands to produce a mechanical power output in excess of the power absorbed in compressing the pressurized air.

22. The system of claim 21, wherein the expander is a turbine.

23. The system of claim 21, further comprising a burner exhaust conduit configured to permit heating of the fuel reformer by the burner exhaust and then to direct the exhaust through the expander.

24. The system of claim 21, further comprising a burner exhaust conduit configured to permit heating of the fuel reformer after the exhaust passes through the expander.

25. The system of claim 21, wherein the air/steam mixture further comprises water in at least a part of a path between the fuel cell and a point of injection into the burner.

26. The system of claim 21, further comprising a carbon monoxide removal system.

27. The system of claim 26, wherein the carbon monoxide removal system produces an output which comprises less than about 10 ppm of carbon monoxide on a time-averaged basis.

28. The system of claim 21, further comprising the provision of a heat exchanger that cools exhaust from the expander and heats at least one of the feeds for the burner, thereby recuperating the turbine exhaust.

29. The fuel reformer of claim 21, further comprising a shell-type exchanger having annuli with gaps formed between the shells between which heat is exchanged.

30. The fuel reformer of claim 29, wherein the annuli are arranged around a centrally located heat exchanger through which expanded burner exhaust is routed.

31. The fuel reformer of claim 29, further comprising at least one of a high temperature shift bed, a low temperature shift bed, a burner, a partial oxidation reactor, and an autothermal reformer around which the small gap annuli are arranged.

32. An integrated fuel generator/fuel cell system, the system comprising:
  a fuel cell having a cathode and an anode;
  a source of pressurized air coupled to the cathode of the fuel cell;
  a fuel reformer coupled to the fuel cell;
  a mixer in which pressurized air from the source is used to evaporate heated water thereby creating a pressurized air/steam mixture used as a fuel cell oxidant;
  a burner in which the air/steam mixture is combusted with a fuel to create a steam-containing burner exhaust gas; and
  an expander in which the burner exhaust gas expands, thereby creating mechanical energy in excess of the energy used to compress the pressurized air.

33. The system of claim 32, further comprising at least one heat exchanger to heat the air/steam mixture.

34. The system of claim 33, wherein at least one heat exchanger is located within the fuel reformer.

35. The system of claim 34, further comprising a radiator for cooling the fuel cell coolant wherein the radiator is configured to a size smaller than a size required to otherwise cool the coolant if a portion was not being used to humidify the cathode of the fuel cell.

36. The system of claim 32, wherein the mixer comprises a humidifier.

37. The system of claim 32, wherein the heated water is supplied by a fuel cell coolant.

38. The system of claim 32, wherein the expander is a turbine.

39. The system of claim 32, further comprising a burner exhaust conduit configured to permit heating of the fuel reformer by the burner exhaust and then to direct the exhaust through the expander.

40. The system of claim 32, further comprising a burner exhaust conduit configured to permit heating of the fuel reformer after the exhaust passes through the expander.

41. The system of claim 32, wherein the air/steam mixture further comprises water in at least a part of a path between the fuel cell and a point of introduction into the burner.

42. The system of claim 32, further comprising a carbon monoxide removal system.

43. The system of claim 42, wherein the carbon monoxide removal system produces an output which comprises less than about 10 ppm of carbon monoxide on a time-averaged basis.

44. A method of increasing the efficiency of a fuel cell, the method comprising the steps of:
  converting at least some waste heat of the fuel cell to a pressurized gas/steam mixture by evaporating heated cooling water into a pressurized oxygen-containing gas and passing the gas through the fuel cell as oxidant;
  heating the gas/steam mixture;
  passing the heated mixture through an expander;
  recovering mechanical power from the expander in excess of the power absorbed in compressing the pressurized oxygen-containing gas; and
  using a heat exchanger that cools the exhaust after it leaves the expander as a preheater for at least one of the feeds for the burner, thereby recuperating the expander exhaust.

45. The method of claim 44, wherein the step of heating is provided by at least one of the sources selected from the group consisting of a combustion zone, exhaust of a combustion zone, a fuel reformer; and a carbon monoxide removal system.

46. The method of claim 44, wherein the expander is a turbine.

47. A method for generating power from fuel cell waste heat comprising the steps of:
  evaporating water into pressurized air using waste heat from a fuel cell to create a pressurized air/steam mixture;
  reacting the air/steam mixture in a burner to produce a steam-containing exhaust;
  driving an expander with the steam-containing exhaust to produce mechanical energy in excess of the energy used to compress the pressurized air; and
  using a heat exchanger that cools the exhaust after it leaves the expander as a preheater for at least one of the feeds for the burner, thereby recuperating the expander exhaust.

48. The method of claim 47, wherein the steam-containing exhaust is a heat source for a fuel reformer.

49. The method of claim 48, wherein the fuel reformer conducts at least one reaction selected from the group consisting of steam reforming, partial oxidation and autothermal reforming.

50. The method of claim 49, wherein the fuel reformer reaction comprises steam reforming.

51. The method of claim 47, further comprising the step of treating a reformate to reduce carbon monoxide concentration.

52. The method of claim 51, wherein the step of treating a reformate is at least one of the reactions selected from the group consisting of a water gas shift, preferential oxidation of carbon monoxide, preferential methanation of carbon monoxide with hydrogen on a catalyst, separation of hydrogen in a pressure swing absorption bed, separation of hydrogen in a temperature swing absorption bed, and separation of hydrogen by a hydrogen-selective membrane.

53. The method of claim 51, wherein the step of treating a reformate comprises a water gas shift.

54. The method of claim 51, wherein the step of treating a reformate consists essentially of at least one water gas shift and at least one preferential oxidation of carbon monoxide.

55. The method of claim 47, further comprising the step of heating a reformer with the burner exhaust before driving the expander.

56. The method of claim 47, further comprising the step of heating a reformer with the burner exhaust after driving the expander.

57. The method of claim 47, further comprising the step of preheating the air/steam mixture by heat exchange with the steam-containing exhaust before reacting the air/steam mixture.

58. The method of claim 47, further comprising the step of using at least some of the air/steam mixture as a humidified oxidant of a fuel cell before evaporating water into pressurized air.

59. The method of claim 47, further comprising the step of introducing additional water into the air/steam mixture.

60. The method of claim 59, wherein the step of introducing additional water occurs after the mixture has emerged from the fuel cell.

61. The method of claim 59, wherein the air/steam mixture travels a path from the fuel cell to the burner and wherein water is present in the air/steam mixture in at least part of the path.

62. The method of claim 61, further comprising the step of removing water from the air/steam mixture at a selected point in the path before introduction of the mixture into the burner.

63. The method of claim 47, wherein the expander is a turbine.

* * * * *